March 17, 1931.  E. B. NICHOLS  1,797,014
MILK TREATMENT TANK
Filed Nov. 12, 1923
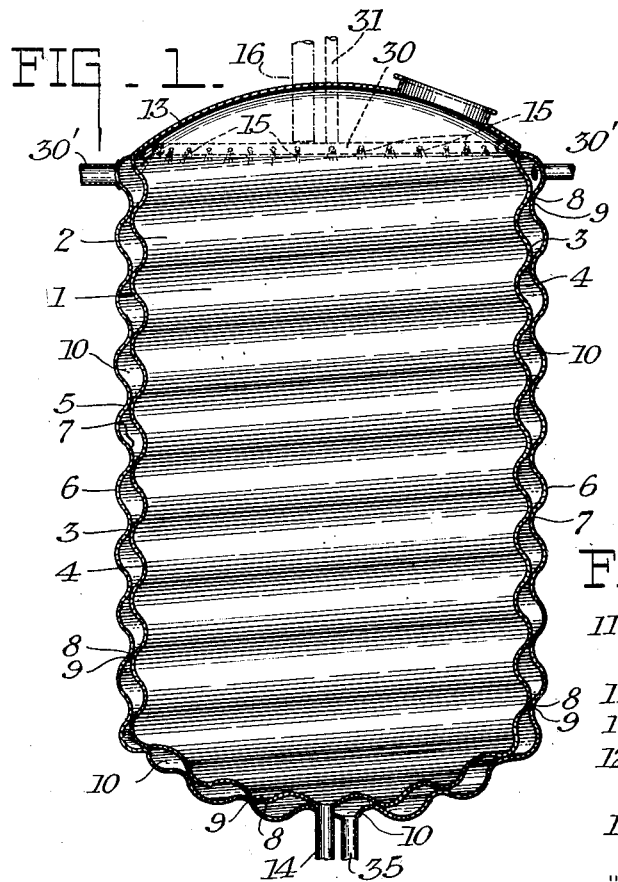
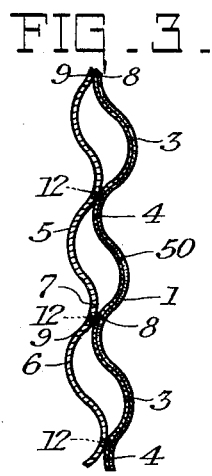
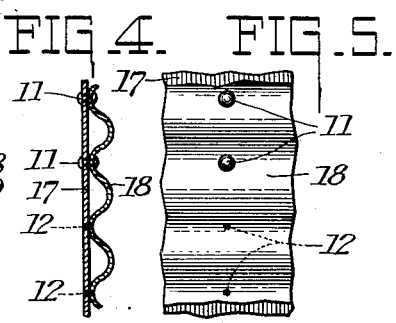
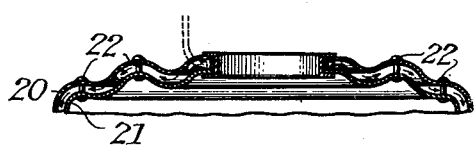
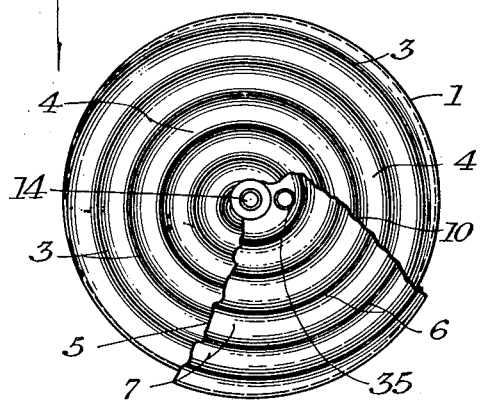
Inventor,
Edgar B. Nichols Patented Mar. 17, 1931

1,797,014

UNITED STATES PATENT OFFICE

EDGAR B. NICHOLS, OF ROCHESTER, NEW YORK

MILK-TREATMENT TANK

Application filed November 12, 1923. Serial No. 674,316.

This invention relates to containers and particularly to containers used for treating fluids with heat or cold, being particularly adapted for use in pasteurizing milk. One object of my invention is to provide a tank which can be constructed of light weight material, but which will be strong; another object is to construct a tank in which one shell is reinforced by another; another object is to provide a double walled tank in which the coefficients of expansion of the several walls may differ; another object is to provide a tortuous fluid passageway between the two walls, giving a larger heat efficiency; and other objects will appear from the following specification, the novel features being pointed out in the claims at the end thereof.

In the drawings, in which like reference characters denote like parts throughout:

Fig. 1 is a section through a tank constructed in accordance with and illustrating one form of my invention;

Fig. 2 is a bottom plan view of the same tank, parts being broken away;

Fig. 3 is a fragmentary sectional section of another type of tank wall;

Fig. 4 is a similar view of still another type of wall;

Fig. 5 is a fragmentary side elevation of the wall shown in Fig. 4;

Fig. 6 is a sectional view of another type of tank head; and

Fig. 7 is a diagrammatic section through a portion of a different tank wall, and also illustrating different methods of corrugating the walls.

In the dairy industry the necessary milk treating apparatus requires tanks having a number of different features heretofore not obtained in a single vessel. For instance, certain tanks should present a surface to the milk which will not corrode or form chemical reactions therewith. They should also be capable of sustaining considerable pressure, and should have a relatively large surface exposed to the action of heating or cooling mediums. The ideal tank should also be of light weight.

Glass lined or enamel lined tanks present an ideal surface to the milk, but require a very heavy tank having practically the same coefficients of expansion as the glass or enamel to prevent cracking. Such tanks are heavy, expensive, and are difficult to heat and cool. Nickel is a suitable metal for milk treatment tanks but is expensive, particularly when of sufficient weight to withstand pressure. In my tank I have overcome the difficulties usually present in these types of tanks.

Coming now to the drawings, in Fig. 1, there is a tank consisting of a shell 1 in this instance being made of nickel, selected or suitable for the material (milk) to be treated, and having deformed walls here shown in the form of spiral corrugations 2 having ridges 3 and valleys 4. A second shell selected primarily for strength as cast iron or steel 5 surrounds shell 1 and is likewise corrugated, the ridges 6 and valleys 7 being of such dimension that the inside diameter of one shell is slightly smaller than the outside diameter of the other. By placing one in the other and turning it, certain parts 8 of shell 1 will come into contact with certain parts 9 of shell 5, leaving a tortuous channel 10 or spiral path between the shells. These shells may then be fastened by riveting as at 11, but I prefer to spot weld them at intervals, as indicated by numerals 12. Such a tank is very strong because the corrugating gives to each shell the maximum strength that can be obtained with a given thickness of metal, and in addition permits the shells to reinforce each other into a form of truss. Metals of different properties can be used, as nickel and steel, the curved separated areas permitting different degrees of expansion and contraction. The tank is light in weight and has a large surface area. The channel 10 forms a fluid passage way for a cooling brine or heating fluid.

If desired the milk container may be of glass lined steel, as the reinforcing shell will not restrict expansion and contraction to a prohibitive degree. Such a wall is shown in Fig. 3, where 50 indicates the glass lining to shell 1.

A suitable cover 13 may be provided for tank 1, being usually equipped with an entrance pipe 16, and any desired exit pipe 14 may be used from the bottom of the tank.

By using spiral corrugations in the bottom, the milk drains down to the exit pipe.

As shown in dotted lines 15 the milk may be merely sprayed on the inside tank wall, when it will flow in a thin film slowly over the corrugations, which, of course, greatly increase the length of the path over which the fluid flows over that usually obtained in a tank of given dimensions. With such apparatus the temperature can be quickly altered, by supplying the temperature altering fluid to the tortuous channel 10.

In Fig. 2 I have illustrated the relative locations of the ridges and valleys of the two shells, showing the spiral way 10 which may lead fluid from an intake pipe 30' around the tank in a long path to an exit pipe 35.

This path can be readily altered, as is shown in Fig. 7 where the lines AB, AC, AD, AE and AF indicate diagrammatically how the "pitch" of the corrugation may be formed, so that instead of one path 10, a series of paths of steeper pitch and shorter length result.

In Figs. 4 and 5 one shell 17 has an uncorrugated or plane wall, while the other shell 18 is deformed. Such construction is most useful where the inner shell is not subject to extremes of expansion and contraction.

In Fig. 6 I have illustrated a tank cover having spaced deformed walls 20 and 21 held together with spacing rivets 22. Such a tank is not as strong as the form shown in Fig. 1, but is, nevertheless, well suited for low pressures and particularly for heating and cooling tanks.

It should be noted that the corrugations not only give a greater surface area and retard the flow of the liquids, but in addition, experiments show that they will evenly distribute a small flow of fluid, such as may be obtained by spraying as above described, into a thin film over a large area, thus materially aiding rapid heat transfer.

From a practical standpoint the above described tanks can be easily made by the following process. The corrugated tanks may be made either by corrugating the sheet metal before or after forming into a tank or shell, although I prefer to do this step before the tank is made. The dimensions need not be very accurate because I place one corrugated tank in the other and turn one relative to the other thus bringing certain parts into contact, and when in this position I fasten by spot welding. It is obvious that the portions which contact may differ if the tanks are of different dimensions, so that extreme accuracy is not required.

Having thus described my invention, what I claim as new and desire to secure by Letters Patent is:

1. In combination, a tank comprising inner and outer spirally corrugated shells, the maximum diameter of the inner shell corrugations having a greater diameter than the minimum diameter of the outer shell corrugations whereby portions of the two corrugations contact spacing other portions and forming a passageway between portions of the two shells.

2. In combination, tank comprising spirally corrugated shells, one shell comprising an inner shell, spiral corrugations forming irregular walls of the shell and portions of the corrugations extending outwardly therefrom, the other shell comprising an outer shell, corrugations forming irregular walls of the shell and portions of the corrugations extending inwardly therefrom, the diameter of the outwardly extending corrugation portions being greater than the diameter of the inwardly extending corrugation portions whereby the two may be fastened at their contacting parts.

3. In combination, a tank comprising a pair of shells, one an inner shell having corrugations with portions extending outwardly, the other an outer shell having corrugations parts of which extend inwardly, the inwardly projecting parts being of less diameter than the outwardly extending parts of the corrugation whereby parts of the two corrugations contact and are fastened together forming a double walled tank.

4. In combination, a tank comprising a pair of united sheet metal shells, each shell having corrugations rolled in, parts of the corrugations constituting an inwardly extending projection on the outer shell, and an outwardly extending projection on the inner shell, the diameter of the two projections being different so that parts of the corrugations may contact and may be joined together whereby a unitary reinforced tank is formed.

Signed at Rochester, New York, this 27th day of Oct., 1923.

EDGAR B. NICHOLS.